United States Patent Office 3,763,152
Patented Oct. 2, 1973

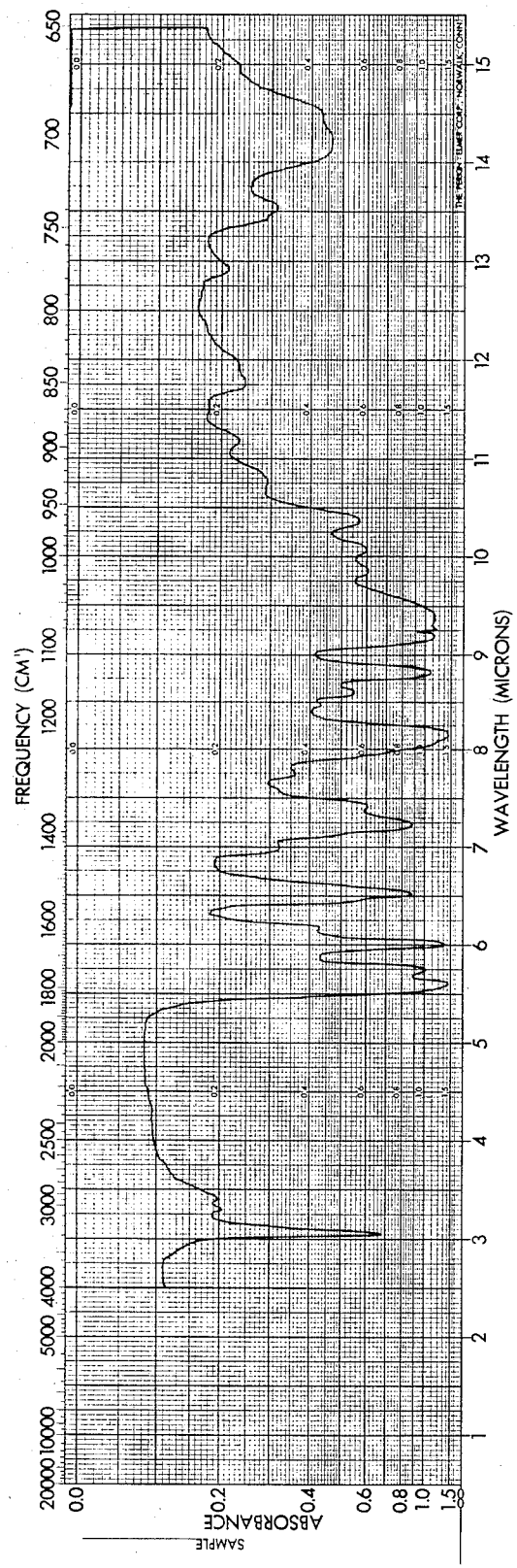

3,763,152
NEUTRAL CEPHALOSPORIN ANHYDRIDES
Milton Wolf, West Chester, and John H. Sellstedt, King of Prussia, Pa., assignors to American Home Products Corporation, New York, N.Y.
Continuation-in-part of abandoned application Ser. No. 107,437, Jan. 18, 1971, which is a continuation-in-part of application Ser. No. 843,841, July 22, 1969, now Patent No. 3,635,953, dated Jan. 18, 1972, which in turn is a continuation-in-part of abandoned application Ser. No. 760,090, Sept. 17, 1968. This application Aug. 11, 1971, Ser. No. 170,687
Int. Cl. C07d 99/24
U.S. Cl. 260—243 C     3 Claims

ABSTRACT OF THE DISCLOSURE

This invention is concerned with novel antibiotically active anhydrides of cephalosporanic acid derivatives.

CROSS REFERENCE TO RELATED APPLICATION

This application is a continuation-in-part of United States patent application ser. No. 107,437 filed Jan. 18, 1971, now abandoned, which is a continuation-in-part of application Ser. No. 943,841 filed July 22, 1969, now U.S. 3,635,953, issued Jan. 18, 1972, which is a continuation-in-part of Ser. No. 760,090 filed Sept. 17, 1968, which is now abandoned.

DESCRIPTION OF THE INVENTION

This invention is concerned with novel compounds of Formula A:

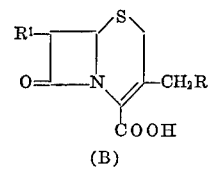

wherein
$R_1$ is selected from the group consisting of those having the formulae:

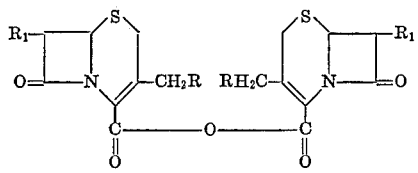

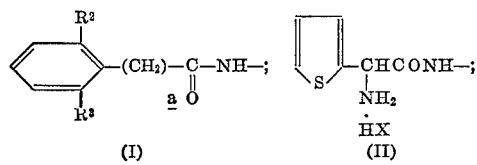

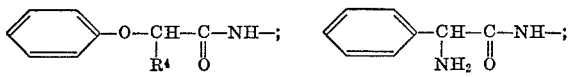

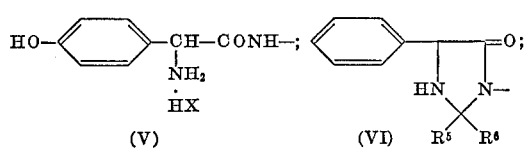

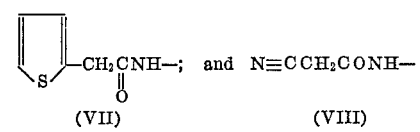

wherein
$R^2$ and $R^3$ are selected from the group consisting of hydrogen and lower alkoxy; $R^4$ is selected from the group consisting of hydrogen, lower alkyl and phenyl; $R^5$ and $R^6$ when taken separately are selected from the group consisting of hydrogen and lower alkyl, and when taken together with the carbon atom to which they are attached complete a ring selected from the group consisting of cycloalkyl containing from about 4 to about 8 carbon atoms and piperidine;
$a$ is an integer from 0 to 1;
X is the anion of a pharmaceutically acceptable acid;
R is selected from the group consisting of hydrogen, acyloxy, N-pyridinium and hydroxy.

The compounds of the invention are prepared by the use of a dehydrating agent such as thionyl chloride, oxalyl chloride, pseudosaccharin bromide or pseudosaccharin chloride. Many other dehydrating agents may be suitably employed. The compounds may be prepared from compounds of Formula B:

$$\text{(B)}$$

$R_1$ and R are the same as hereinabove described. The free acids of Formula B are first converted to a salt by treatment with triethylamine or a weakly basic alkali metal compound. Thereafter the dehydrating agent is added and the anhydride is recovered by conventional techniques.

In preparation of compounds of Formula A which contain nucleophilic groups it will be appreciated by those skilled in the art that the nucleophilic groups must be protected to eliminate undesirable side reactions which would interfere with the production of the anhydride. These protecting groups are well-known and may be subsequently removed to yield the salts of Formula A by techniques well-known to those skilled in the art.

The novel anhydrides of the invention are antibiotically active compounds which may be usued in vitro for the inhibition of susceptible bacteria. The anhydrides may also be used in vivo in animals for the treatment of susceptible bacterial infections and for growth promotion of animals. For example the anhydride of cephalothin may be used in vitro for the inhibition of Staphylococcus aureus, Smith at a concentration of 0.244 mcg./ml. when applied in an aqueous diluent. The novel anhydrides are also useful as intermediates for the preparation of 7-aminocephalosporanic acid. The particular process in which they may be used is based on the halogenation of the anhydride with a reagent such as phosphorous pentachloride. The reaction is conducted preferably in an organic solvent such as methylene chloride, etc. at a temperature preferably between −10° C. and −60° C. Thereafter an alcohol is added to form the imino ether which is later split off by hydrolysis which also splits the anhydride to yield 7-aminocephalosporanic acid.

As used herein and in the appended claims the term (lower) alkyl is used to include hydrocarbon groups containing from one to about six carbon atoms including methyl, ethyl, i-propyl, n-propyl, n-butyl and the like. The term (lower) alkoxy is used to include hydrocarbonoxy groups containing from one to about six carbon atoms such as methoxy, ethoxy, n-propoxy, and the like. The term halogen is used to include bromine, chlorine, fluorine and iodine. The term anion of a pharmaceutically acceptable acid is used to include anions of non-toxic acids such as hydrochloric, hydrobromic, methanesulfonic, sulfuric, and the like. The term acyloxy is used to denote radicals derived from aliphatic carboxylic acids which contain from one to about six carbon atoms. Those skilled in the art will appreciate that some of the compounds described herein contain an asymmetric carbon and may exist as diasteroisomers. It is intended that each of these forms shall be within the scope of this invention.

As a further definitive description of one of the best mode embodiments of the invention, FIG. 1 contains an infrared absorption spectra of the compound which is described herein as the anhydride of cephalothin.

Specific compounds of Formula A wherein the R substitutent is other than acetoxymethyl or methyl may be prepared by techniques well-known to those skilled in the art.

EXAMPLE I

Cephalothin anhydride

Triethylammonium 3-acetoxymethyl - 8 - oxo-5-thia-7-(thiophene-2-acetamido - 1 - azabicyclo[2.2.0]oct-2-en-2-carboxylate (3.3 g., 0.00663 mole) is dissolved in methylene chloride (100 ml.) and the solution is cooled to 3° C. Then 3-chloro-1,2-benzisothiazole 1,1-dioxide (1.33 g., 0.00663 mole) is added to the magnetically stirred solution all at once. The solution is allowed to warm to room temperature overnight, giving white crystals that were washed with cold methylene chloride to afford the product.

*Analysis.*—Calc'd for $C_{32}H_{30}N_4O_{11}S_4$ (percent): C, 49.60; H, 3.90; N, 7.23. Found (percent): C, 49.49, 49.52; H, 4.07, 3.99; N, 7.76.

EXAMPLE II

Cephalothin anhydride

Cephalothin acid (2.02 g., 5.08 mmole) is dissolved in cold dichloromethane (50 ml.) with the addition of triethylamine (0.514 g., 5.08 mole). This solution is added over one-half hour to a solution of pseudosaccharin chloride (1.076 g., 5.34 mole) in dichloromethane (50 ml.) at room temperature. The solution is stirred for two hours and kept overnight. Cephalothin anhydride (0.93 g.) is filtered off and crystallized from boiling acetonitrile (40 ml.) giving a white crystalline solid (0.35 g.), M.P. 179° (dec.).

*Analysis.*—Calc'd for $C_{32}H_{30}N_4O_{11}S_4$ (percent): C, 49.60; H, 3.90; N, 7.23. Found (percent): C, 49.50; H, 4.02; N, 7.18.

EXAMPLE III

By following the procedure employed in Example II, the following anhydrides are prepared:

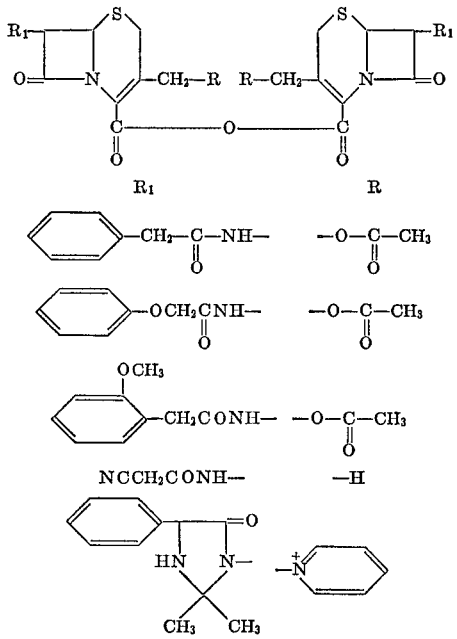

EXAMPLE IV

By a modification of the procedure of Example II wherein the amino group of the $R_1$ moiety is provided with a protecting acyl group such as $(CH_3)_3$ COCO— or some other functionally equivalent group which may then be transformed to a hydrohalide salt, the following compounds are prepared:

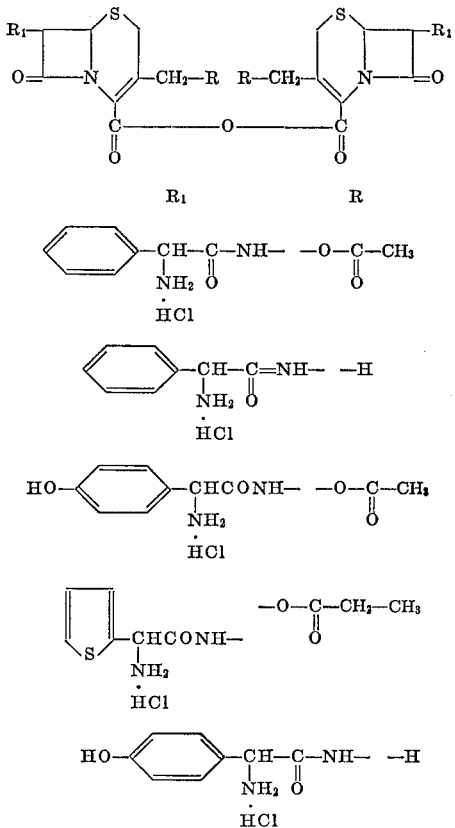

EXAMPLE V 3-methyl-7-phenoxyacetamide-$\Delta^3$-cepham-4-carboxylic acid symmetrical anhydride Triethylamine (0.360 g., 3.56 mmole) is weighted into a tared flask and dichloromethane (35 ml.) is added. The solution is cooled to —60° in an acetone-Dry Ice bath and 3-methyl - 7 - phenoxyacetamido-$\Delta^3$-cephem-4-carboxylic acid (1.24 g., 3.56 mmole) is added, and the mixture is stirred for 15 minutes at —60°. Pseudosaccharin chloride (0.718 g., 3.56 mmole) is added and the stirred solution is allowed to warm to room temperature overnight. The solution is washed with water, dilute cold sodium bicarbonate, brine, dried with magnesium sulfate, and evaporated at 40° to a foam (1.40 g.). A portion of the foam (0.6 g.) is crystallized from preboiling acetonitrile (30 ml.), giving a white solid (0.2), M.P. 212–214° dec.

*Analysis.*—Calc'd for $C_{32}H_{30}N_4O_9S_2$ (percent): C, 56.62; H, 4.46; N, 8.26. Found (percent): C, 56.18; H, 4.31; N, 8.37.

EXAMPLE VI 7-aminocephalosporanic acid

To a mixture of 67 g. (0.16 mol) of sodium cephalothin, 51.5 ml. (0.41 mol) of N,N-dimethylaniline and 250 ml. of methylene chloride is added 6.9 ml. (0.081 mol) of oxalyl chloride in 25 ml. of methylene chloride over ½ hr. at 15–20°. After stirring ¾ hr. at room temperature the reaction mixture is cooled to —30° and 36 g. (0.17 mol) of powdered phosphorus pentachloride is added all at once. The temperature is maintained at —20° for 2 hr. and then the reaction mixture is cooled to —45°.

Isobutanol (250 ml.) is added at such a rate that the temperature does not rise above —20°. After stirring for 2 hr. the reaction mixture is poured into 340 ml. of water, and the pH is slowly adjusted to 3.5 with about 80 ml. of pyridine. After stirring for 1 hr. at pH 3.5, the mixture is cooled to 0–5° and stirred overnight. The mixture is filtered and washed with 50 ml. of 1:1 acetone-water, followed by 50 ml. of acetone, giving the title compound.

We claim:

1. A compound of the formula:

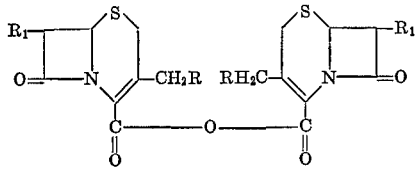

wherein $R_1$ is a member from the group consisting of

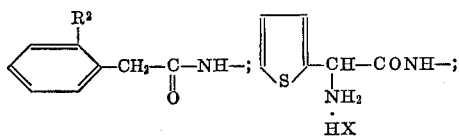

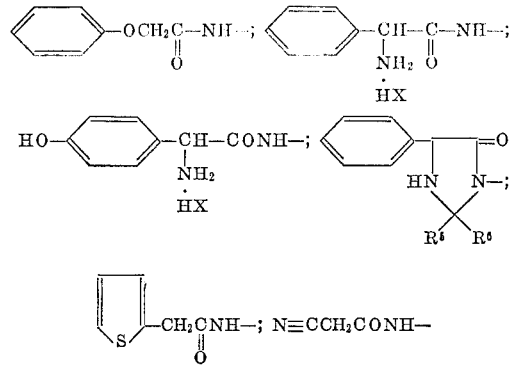

in which $R_2$ is a member selected from the group consisting of —H and lower alkoxy, $R^5$ and $R^6$ are members selected from the group consisting of —H and lower alkyl, X is the anion of a pharmaceutically accepable acid, and R is a member selected from the group consisting of —H, lower alkanoyloxy and N-pyridinium.

2. A compound as defined in claim 1, which is:

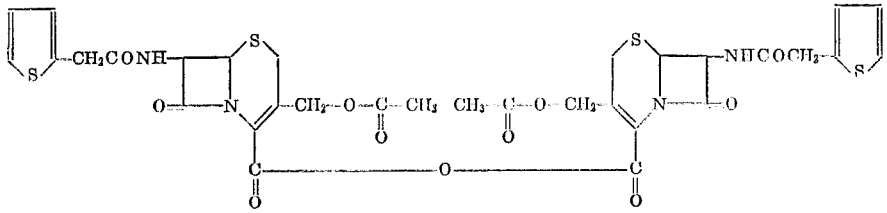

3. A compound as defined in claim 1, which is:

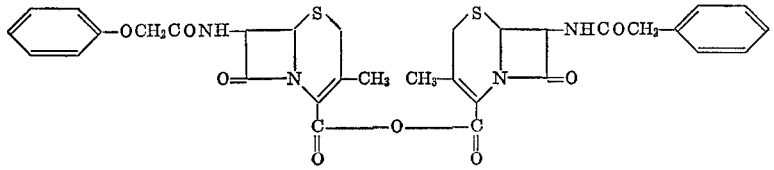

References Cited

UNITED STATES PATENTS

| | | | |
|---|---|---|---|
| 3,487,074 | 12/1969 | Sheehan | 260—243 C |
| 3,488,729 | 1/1970 | Chauvette | 260—243 C |

NICHOLAS S. RIZZO, Primary Examiner

U.S. Cl. X.R.

424—246